(12) United States Patent
Lee (10) Patent No.: US 9,851,602 B2
(45) Date of Patent: Dec. 26, 2017

(54) OPTICAL MEMBER AND DISPLAY DEVICE HAVING THE SAME

(71) Applicant: Sun Hwa Lee, Seoul (KR)

(72) Inventor: Sun Hwa Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 80 days.

(21) Appl. No.: 14/747,577

(22) Filed: Jun. 23, 2015

(65) Prior Publication Data

US 2015/0286098 A1 Oct. 8, 2015

Related U.S. Application Data

(63) Continuation of application No. 14/233,440, filed as application No. PCT/KR2012/004611 on Jun. 11, 2012, now Pat. No. 9,304,355.

(30) Foreign Application Priority Data

Jul. 18, 2011 (KR) .................. 10-2011-0071142

(51) Int. Cl.
*G02F 1/133* (2006.01)
*G02F 1/1335* (2006.01)
(Continued)

(52) U.S. Cl.
CPC .......... *G02F 1/133617* (2013.01); *F21V 9/16* (2013.01); *G02F 1/133514* (2013.01);
(Continued)

(58) Field of Classification Search
CPC ................ F21V 9/16; G02F 1/133617; G02F 1/133514; G02F 1/133603; G02F 1/133609; G02F 1/3556; H01J 11/48; H01J 29/90

See application file for complete search history.

(56) References Cited

U.S. PATENT DOCUMENTS

| 5,998,925 A | 12/1999 | Shimizu et al. |
| 7,004,610 B2 | 2/2006 | Yamashita et al. |

(Continued)

FOREIGN PATENT DOCUMENTS

| CN | 1758114 A | 4/2006 |
| CN | 1869788 A | 11/2006 |

(Continued)

OTHER PUBLICATIONS

Final Office Action dated Jul. 30, 2015 in U.S. Appl. No. 14/233,440.

(Continued)

*Primary Examiner* — James Dudek
(74) *Attorney, Agent, or Firm* — Saliwanchik, Lloyd & Eisenschenk (57) ABSTRACT

Disclosed are an optical member and a display device having the same. The optical member includes a first substrate, a plurality of wavelength conversion parts provided on the first substrate while being spaced apart from each other, and a sealing layer on a top surface of the wavelength conversion parts and at a lateral side of the wavelength conversion parts. Each of the wavelength conversion parts includes a host on the first substrate, and a plurality of wavelength conversion particles in the host.

12 Claims, 8 Drawing Sheets

(51) Int. Cl.
*H01J 29/90* (2006.01)
*H01J 11/48* (2012.01)
*F21V 9/16* (2006.01)
*G02F 1/355* (2006.01)
*G02F 1/017* (2006.01)
*F21Y 115/10* (2016.01)

(52) U.S. Cl.
CPC .. *G02F 1/133603* (2013.01); *G02F 1/133609* (2013.01); *G02F 1/3556* (2013.01); *H01J 11/48* (2013.01); *H01J 29/90* (2013.01); *F21Y 2115/10* (2016.08); *G02F 2001/01791* (2013.01); *G02F 2001/133614* (2013.01); *G02F 2202/36* (2013.01)

(56) References Cited

U.S. PATENT DOCUMENTS

| | | | |
|---|---|---|---|
| 7,040,774 B2 | 5/2006 | Beeson et al. | |
| 7,481,562 B2 | 1/2009 | Chua et al. | |
| 7,795,055 B2 | 9/2010 | Lee et al. | |
| 8,035,590 B2 | 10/2011 | Kakinuma et al. | |
| 8,038,822 B2 | 10/2011 | Kindler et al. | |
| 8,545,083 B2 | 10/2013 | Terajima et al. | |
| 9,110,200 B2 | 8/2015 | Nichol et al. | |
| 9,244,209 B2 | 1/2016 | Lee et al. | |
| 9,304,355 B2 * | 4/2016 | Lee | H01J 29/90 |
| 9,335,459 B2 | 5/2016 | Kang | |
| 2001/0001207 A1 | 5/2001 | Shimizu et al. | |
| 2002/0001055 A1 | 1/2002 | Kimura et al. | |
| 2002/0071071 A1 | 6/2002 | Sekiguchi et al. | |
| 2003/0066998 A1 | 4/2003 | Lee | |
| 2003/0165781 A1 | 9/2003 | Takeda | |
| 2004/0046242 A1 | 3/2004 | Asakawa | |
| 2004/0190279 A1 | 9/2004 | Kitamura | |
| 2005/0001225 A1 | 1/2005 | Yoshimura et al. | |
| 2005/0221519 A1 * | 10/2005 | Leung | H01L 33/507 438/27 |
| 2006/0002101 A1 | 1/2006 | Wheatley et al. | |
| 2006/0034084 A1 | 2/2006 | Matsuura et al. | |
| 2006/0034579 A1 | 2/2006 | Sugiura | |
| 2006/0072315 A1 | 4/2006 | Han et al. | |
| 2006/0092666 A1 | 5/2006 | Jeong et al. | |
| 2006/0132034 A1 | 6/2006 | Cho et al. | |
| 2006/0227532 A1 | 10/2006 | Ko et al. | |
| 2006/0227570 A1 | 10/2006 | Rutherford et al. | |
| 2006/0268537 A1 | 11/2006 | Kurihara et al. | |
| 2006/0268579 A1 | 11/2006 | Han et al. | |
| 2007/0004195 A1 | 1/2007 | Park et al. | |
| 2007/0012940 A1 | 1/2007 | Suh et al. | |
| 2007/0176196 A1 | 8/2007 | Kim et al. | |
| 2007/0210326 A1 | 9/2007 | Kurihara | |
| 2007/0221865 A1 | 9/2007 | Sohn et al. | |
| 2007/0221866 A1 | 9/2007 | Sohn et al. | |
| 2007/0221943 A1 | 9/2007 | Moriya et al. | |
| 2007/0228390 A1 | 10/2007 | Hattori et al. | |
| 2007/0229736 A1 | 10/2007 | Wang et al. | |
| 2007/0263408 A1 | 11/2007 | Chua | |
| 2008/0037272 A1 | 2/2008 | Song et al. | |
| 2008/0112186 A1 | 5/2008 | Jung et al. | |
| 2008/0237540 A1 | 10/2008 | Dubrow | |
| 2008/0284316 A1 | 11/2008 | Kurihara et al. | |
| 2009/0014688 A1 * | 1/2009 | Hoshino | C01B 33/023 252/301.36 |
| 2009/0021148 A1 | 1/2009 | Hachiya et al. | |
| 2009/0034230 A1 * | 2/2009 | Lim | G02B 6/0028 362/84 |
| 2009/0034292 A1 | 2/2009 | Pokrovskiy et al. | |
| 2009/0040598 A1 | 2/2009 | Ito | |
| 2009/0115936 A1 | 5/2009 | Takeuchi et al. | |
| 2009/0147497 A1 | 6/2009 | Nada | |
| 2009/0152567 A1 | 6/2009 | Comerford et al. | |
| 2009/0173957 A1 | 7/2009 | Brunner et al. | |
| 2009/0231847 A1 | 9/2009 | Pan et al. | |
| 2010/0079901 A1 | 4/2010 | Fukushima | |
| 2010/0110728 A1 | 5/2010 | Dubrow et al. | |
| 2010/0155749 A1 | 6/2010 | Chen et al. | |
| 2010/0164364 A1 | 7/2010 | Eida et al. | |
| 2010/0187975 A1 | 7/2010 | Tsukahara et al. | |
| 2010/0232133 A1 | 9/2010 | Tran et al. | |
| 2010/0232134 A1 | 9/2010 | Tran | |
| 2010/0283072 A1 | 11/2010 | Kazlas et al. | |
| 2010/0295438 A1 | 11/2010 | Ott et al. | |
| 2010/0302493 A1 | 12/2010 | Yang et al. | |
| 2010/0315320 A1 | 12/2010 | Yoshida | |
| 2011/0002140 A1 | 1/2011 | Tsukahara et al. | |
| 2011/0037926 A1 | 2/2011 | Tsukahara et al. | |
| 2011/0044046 A1 | 2/2011 | Abu-Ageel | |
| 2011/0090696 A1 | 4/2011 | Nagai et al. | |
| 2011/0141769 A1 | 6/2011 | Lee et al. | |
| 2011/0156575 A1 | 6/2011 | Yu et al. | |
| 2011/0176328 A1 | 7/2011 | Anandan et al. | |
| 2011/0205750 A1 | 8/2011 | Krijn et al. | |
| 2011/0249424 A1 | 10/2011 | Joo et al. | |
| 2011/0261303 A1 | 10/2011 | Jang et al. | |
| 2011/0299011 A1 | 12/2011 | Weiss et al. | |
| 2012/0106197 A1 | 5/2012 | Lai et al. | |
| 2012/0113672 A1 | 5/2012 | Dubrow et al. | |
| 2012/0170282 A1 | 7/2012 | Lin et al. | |
| 2013/0128548 A1 | 5/2013 | Lin | |
| 2014/0049826 A1 | 2/2014 | Lee et al. | |
| 2014/0153218 A1 | 6/2014 | Hyun | |
| 2014/0160789 A1 | 6/2014 | Park | |
| 2014/0168571 A1 | 6/2014 | Hyun | |
| 2015/0369993 A1 | 12/2015 | Kim et al. | |

FOREIGN PATENT DOCUMENTS

| | | |
|---|---|---|
| CN | 1880839 A | 12/2006 |
| CN | 1881034 A | 12/2006 |
| EP | 2068193 A2 | 6/2009 |
| JP | 09073807 A | 3/1997 |
| JP | 2004303441 A | 10/2004 |
| JP | 2004315661 A | 11/2004 |
| JP | 2007005098 A | 1/2007 |
| JP | 2007173754 A | 7/2007 |
| JP | 2008287073 A | 11/2008 |
| JP | 2008311234 A | 12/2008 |
| JP | 2009-134275 A | 6/2009 |
| JP | 2009200534 A | 9/2009 |
| JP | 2010123918 A | 6/2010 |
| KR | 20060056834 A | 5/2006 |
| KR | 20060125535 A | 12/2006 |
| KR | 20060129835 A | 12/2006 |
| KR | 20070092440 A | 9/2007 |
| KR | 20080007247 A | 1/2008 |
| KR | 20080063986 A | 7/2008 |
| KR | 20090021912 A | 3/2009 |
| KR | 20100024420 A | 3/2010 |
| KR | 20100027892 A | 3/2010 |
| KR | 20100046698 A | 5/2010 |
| KR | 20100047841 A | 5/2010 |
| KR | 20100118557 A | 11/2010 |
| KR | 10-2010-0129030 A | 12/2010 |
| KR | 20110012246 A | 2/2011 |
| KR | 20110068110 A | 6/2011 |
| KR | 10-2012-0001387 A | 1/2012 |
| KR | 1020120070449 A | 6/2012 |
| KR | 1020130009022 A | 1/2013 |
| TW | 200409384 | 6/2004 |
| TW | 200702822 | 1/2007 |
| TW | 200739192 | 10/2007 |
| TW | 200803600 A | 1/2008 |
| TW | 200848809 A | 12/2008 |
| TW | 201035484 A | 10/2010 |
| TW | 201041191 A | 11/2010 |
| TW | 201044067 A | 12/2010 |
| TW | 201105767 A | 2/2011 |
| WO | WO-2012/144720 A1 | 10/2012 |

OTHER PUBLICATIONS

International Search Report in International Application No. PCT/KR2012/004611, filed Jun. 11, 2012.

(56) References Cited

OTHER PUBLICATIONS

Taiwanese Office Action dated Jan. 23, 2015 in Taiwanese Application No. 101125849.
European Search Report dated Feb. 12, 2015 in International Application No. PCT/KR2012/004611.
European Search Report dated Sep. 7, 2015 in European Application No. 15172626.2.
International Search Report in International Application No. PCT/KR2012/004625, dated Dec. 24, 2012.
Notice of Allowance dated Apr. 12, 2013 in Korean Application No. 10-2011-0071135.
European Search Report in European Application No. 12814589.3, dated Apr. 16, 2015.
Office Action dated Jun. 25, 2014 in Taiwanese Application No. 10-1121880.
International Search Report in International Application No. PCT/KR2012/004521, filed Jun. 8, 2012.
Office Action dated Dec. 3, 2014 in Taiwanese Application No. 101121510.
Office Action dated Dec. 24, 2012 in Korean Application No. 10-2011-0069797.
Office Action dated Aug. 18, 2015 in U.S. Appl. No. 14/232,843.
International Search Report in International Application No. PCT/KR2011/009232, filed Nov. 30, 2011.
Office Action dated Jul. 31, 2012 in Korean Application No. 10-2011-0009833.
Office Action dated Mar. 13, 2015 in U.S. Appl. No. 13/982,916.
Office Action dated Mar. 16, 2016 in U.S. Appl. No. 13/982,916.
International Search Report in International Application No. PCT/KR2012/006308, filed Aug. 8, 2012.
Office Action dated Jan. 28, 2016 in Chinese Application No. 201280066300.9.
Office Action dated Aug. 30, 2016 in U.S. Appl. No. 14/234,123.
Office Action dated Jun. 19, 2015 in U.S. Appl. No. 14/234,123.
Office Action dated Dec. 14, 2016 in U.S. Appl. No. 14/234,123.
Office Action dated Nov. 25, 2016 in U.S. Appl. No. 14/747,577.
Office Action dated Dec. 29, 2016 in U.S. Appl. No. 15/136,239.
Office Action dated Jul. 5, 2016 in U.S. Appl. No. 14/356,657.
Office Action dated Jan. 5, 2017 in U.S. Appl. No. 14/356,657.
European Search Report in European Application No. 12814403.7 dated Feb. 13, 2015.
International Search Report in International Application No. PCT/KR2012/005418, filed Jul. 9, 2012.
Office Action dated Apr. 6, 2016 in Taiwanese Application No. 101126235.
Office Action dated Jul. 6, 2015 in U.S. Appl. No. 14/234,117.
Office Action dated Jan. 21, 2016 in U.S. Appl. No. 14/234,117.
International Search Report in International Application No. PCT/KR2012/005353, filed Jul. 5, 2012.
European Search Report dated May 22, 2015 in European Application No. 12811675.3.
Office Action dated Jul. 6, 2015 in U.S. Appl. No. 14/232,850.
Office Action dated Jun. 1, 2016 in U.S. Appl. No. 14/232,850.
Notice of Allowance dated Nov. 17, 2016 in U.S. Appl. No. 14/232,850.
Office Action dated Jun. 24, 2014, in Taiwanese Application No. 101122681.
European Search Report in European Application No. 12815508.2 filed May 28, 2014.
International Search Report in International Application No. PCT/KR2012/004610, filed Dec. 24, 2012.
Office Action dated Oct. 30, 2017 in Korean Application No. 10-2011-0071142.

\* cited by examiner

OPTICAL MEMBER AND DISPLAY DEVICE HAVING THE SAME

CROSS-REFERENCE TO RELATED APPLICATIONS

This application is a continuation of U.S. application Ser. No. 14/233,440, filed Jan. 17, 2014, which is the U.S. national stage application of International Patent Application No. PCT/KR2012/004611, filed Jun. 11, 2012, which claims priority to Korean Patent Application No. 10-2011-0071142, filed Jul. 18, 2011, which are hereby incorporated by reference in their entirety.

BACKGROUND

Technical Field

The embodiment relates to an optical member and a display device having the same.

Background of the Invention

Recently, flat display devices, such as an LCD (liquid crystal display), a PDA (plasma display panel) or an OLED (organic light emitting diode), have been increasingly developed instead of conventional CRTs (cathode ray tubes).

Among them, the LCD includes a liquid crystal display panel having a thin film transistor substrate, a color filter substrate and a liquid crystal injected between the thin film transistor substrate and the color filter substrate. Since the liquid crystal display panel is a non-emissive device, a backlight unit is provided below the thin film transistor substrate to supply light. Transmittance of the light emitted from the backlight unit is adjusted according to the alignment state of the liquid crystal.

The backlight unit is classified into an edge-illumination type backlight unit and a direct-illumination type backlight unit according to the position of a light source. According to the edge-illumination type backlight unit, the light source is located at a lateral side of a light guide plate.

The direct-illumination type backlight unit has been developed as the size of the LCD has become enlarged. According to the direct-illumination type backlight unit, at least one light source is located below the liquid crystal display panel to supply the light over the whole area of the liquid crystal display panel.

When comparing with the edge-illumination type backlight unit, the direct-illumination type backlight unit can employ a large number of light sources so that the high brightness can be achieved. In contrast, the direct-illumination type backlight unit must have thickness larger than thickness of the edge-illumination type backlight unit in order to ensure brightness uniformity.

In order to solve the above problem, a quantum dot bar having a plurality of quantum dots, which can convert blue light into red light or green light, is positioned in front of a blue LED that emits the blue light. Thus, as the blue light is irradiated onto the quantum dot bar, the blue light, the red light and the green light are mixed with each other by the quantum dots distributed in the quantum dot bar and the mixed light is incident into the light guide plate, so that white light is generated.

If the white light is supplied to the light guide plate by using the quantum dot bar, high color reproduction may be realized.

The backlight unit may include an FPCB (flexible printed circuit board) provided at one side of the blue LED, which generates blue light, to supply signals and power to the LED and a bonding member formed under the bottom surface of the FPCB.

The display device capable of displaying various images using the white light supplied to the light guide plate through the quantum dot bar as the blue light is emitted from the blue LED has been extensively used.

The display device employing the quantum dots is disclosed in Korean Unexamined Patent Publication No. 10-2011-0068110.

DISCLOSURE OF INVENTION

Technical Problem

The embodiment provides an optical member, which is eco-friendly and can be easily fabricated at a low cost while representing improved color reproduction, improved reliability, and improved durability, and a display device.

Solution to Problem

According to the embodiment, there is provided an optical member including a first substrate, a plurality of wavelength conversion parts provided on the first substrate while being spaced apart from each other, and a sealing layer on a top surface of the wavelength conversion parts and at a lateral side of the wavelength conversion parts. Each of the wavelength conversion parts includes a host on the first substrate, and a plurality of wavelength conversion particles in the host.

According to the embodiment, there is provided a display device including a display panel including a plurality of pixel regions, a wavelength conversion member provided under the display panel and including wavelength conversion parts corresponding to the pixel regions, respectively, and a light source to generate a light incident into the wavelength conversion member.

Advantageous Effects of Invention

As described above, the optical member according to the embodiment includes a sealing layer provided at the lateral side of the wavelength conversion parts and on the top surface of the wavelength conversion parts. In other words, the sealing layer covers the lateral side of the wavelength conversion parts and the top surface of the wavelength conversion parts to protect the wavelength conversion parts, that is, the wavelength conversion particles from being external oxygen and/or moisture. In other words, since the sealing layer seals the lateral side of each wavelength conversion part, the sealing layer can represent improved sealing power.

Accordingly, the optical member according to the embodiment can represent improved reliability and improved durability.

In addition, the wavelength conversion parts are spaced apart from each other. Therefore, the wavelength conversion particles are not provided in the space between the wavelength conversion parts. Therefore, the optical member and the display device according to the embodiment can reduce the number of wavelength conversion particles to be used.

Therefore, the liquid crystal display according to the embodiment can be easily fabricated at a low cost.

In addition, since the wavelength conversion parts correspond to the pixel regions, the wavelength conversion parts convert light output from the light source, so that the light can be effectively incident into the display panel. In other words, the wavelength conversion member can concentrate light having a converted wavelength on pixel regions of the display panel requiring the light having the converted wavelength.

Accordingly, the optical member and the display device according to the embodiment can represent improved color reproduction.

MODE FOR THE INVENTION

In the description of the embodiments, it will be understood that, when a substrate, a frame, a sheet, a layer, or a pattern is referred to as being "on" or "under" another substrate, another frame, another sheet, another layer, or another pattern, it can be "directly" or "indirectly" on the other substrate, frame, sheet, layer, or pattern, one or more intervening layers may also be present. Such a position of each element has been described with reference to the drawings. The thickness and size of each element shown in the drawings may be exaggerated, omitted or schematically drawn for the purpose of convenience or clarity. In addition, the size of elements does not utterly reflect an actual size.

Figure 1:
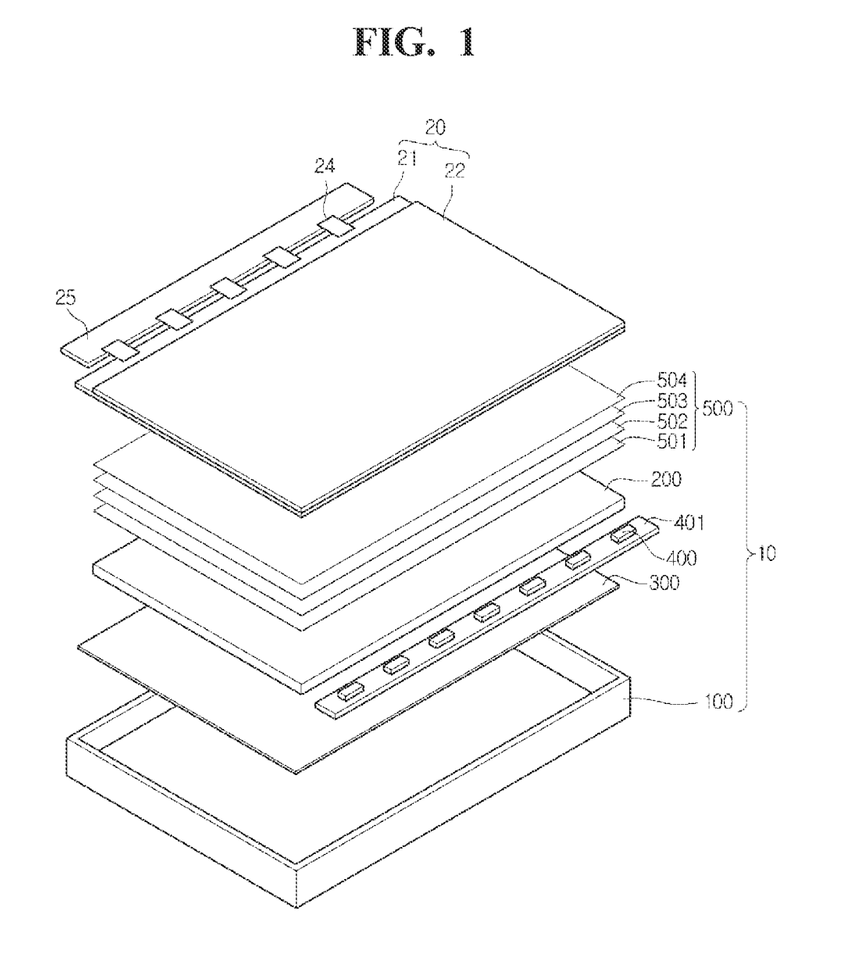
FIG. 1 is an exploded perspective view showing a liquid crystal display according to the embodiment.
Figure 2:
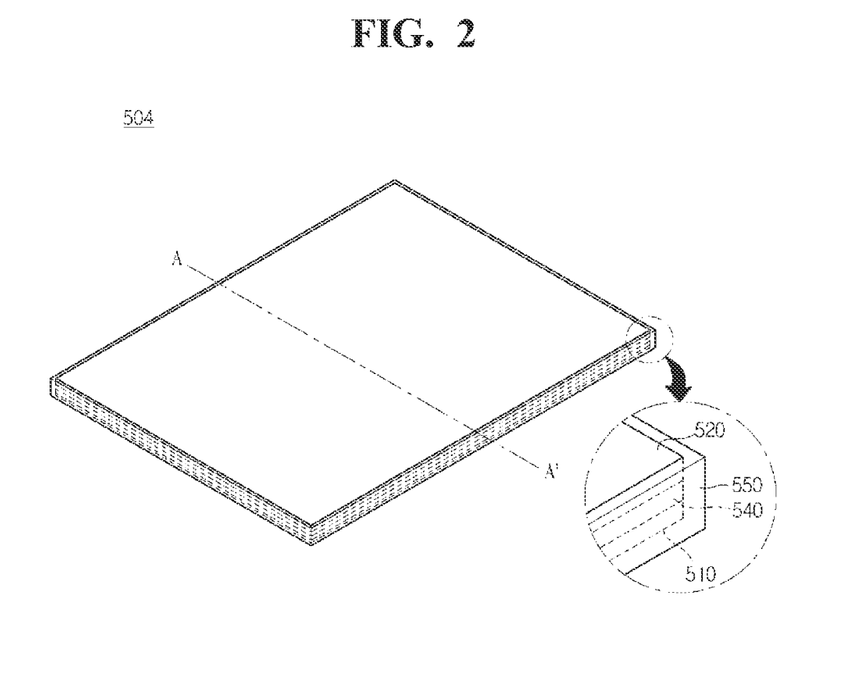
FIG. 2 is a perspective view showing a wavelength conversion member according to the embodiment.
Figure 3:
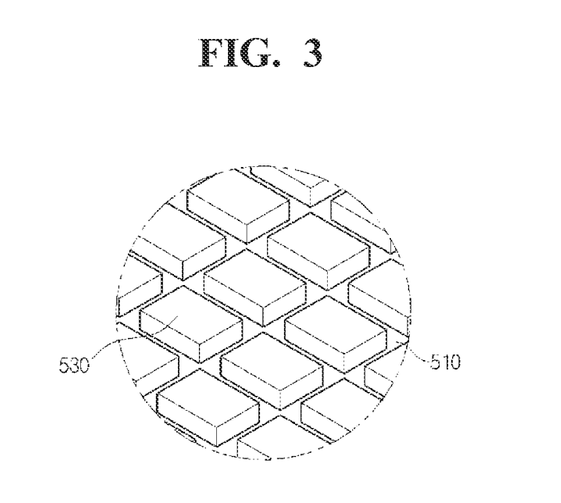
FIG. 3 is a sectional view taken along line A-A' of FIG. 2.
Figure 4:
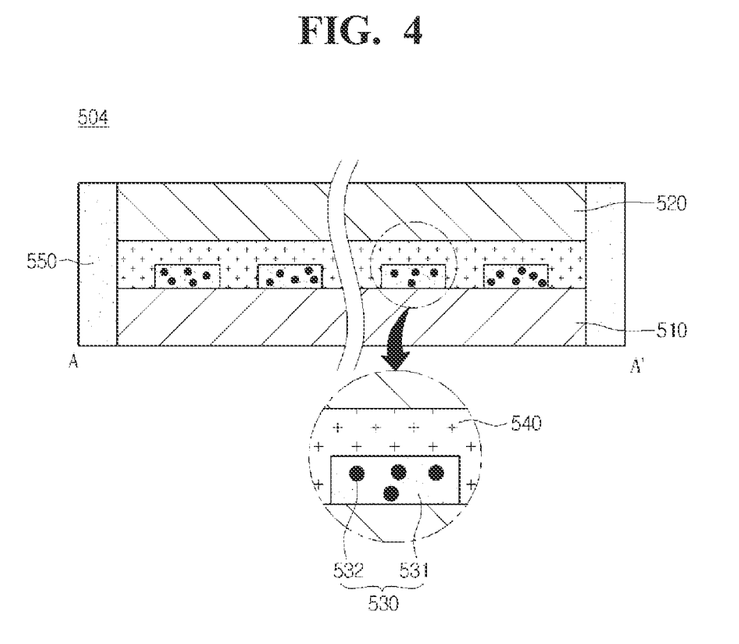
FIGS. 4 to 6 are sectional views showing the manufacturing process of the wavelength conversion member according to the embodiment.
Figure 5:
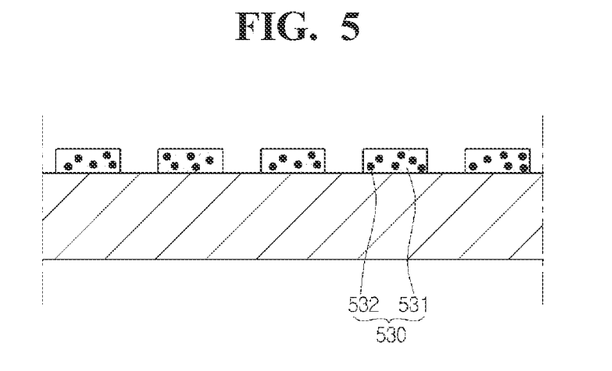
Figure 6:
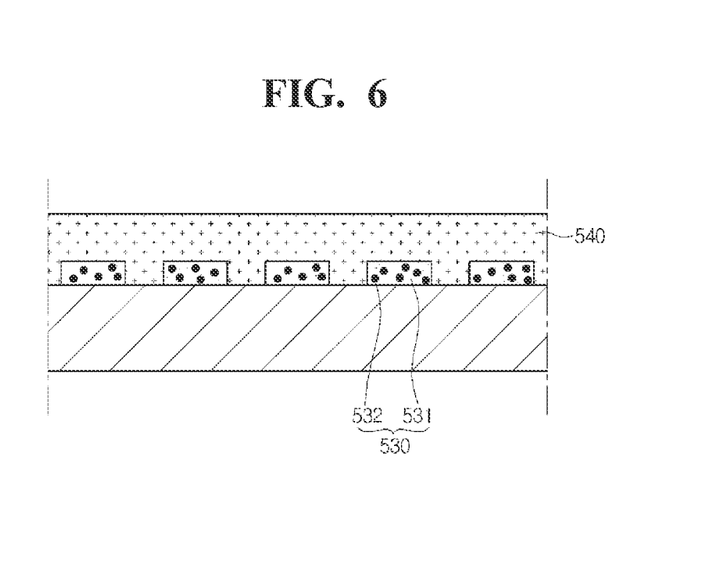
Figure 7:
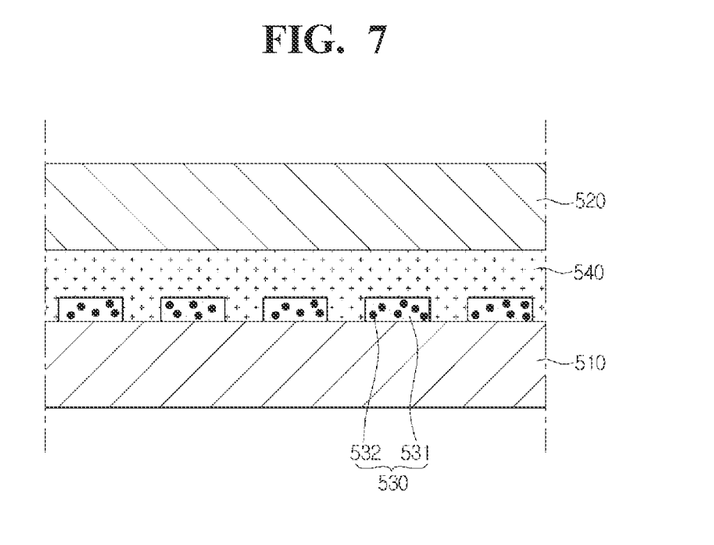
FIG. 7 is a sectional view showing another example of the wavelength conversion member.
Figure 8:
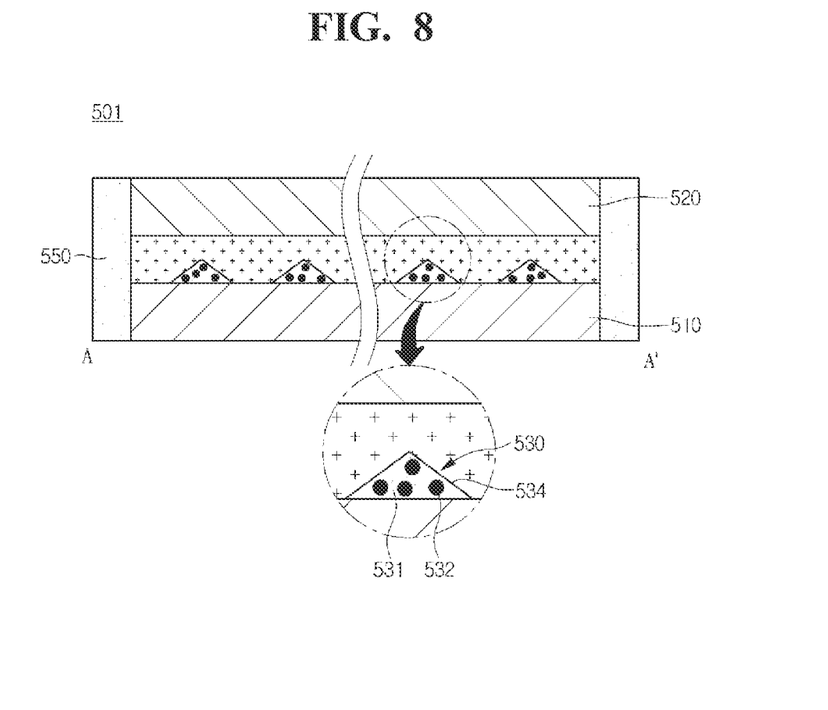
FIG. 8 is a sectional view showing still another example of the wavelength conversion member.
Figure 9:
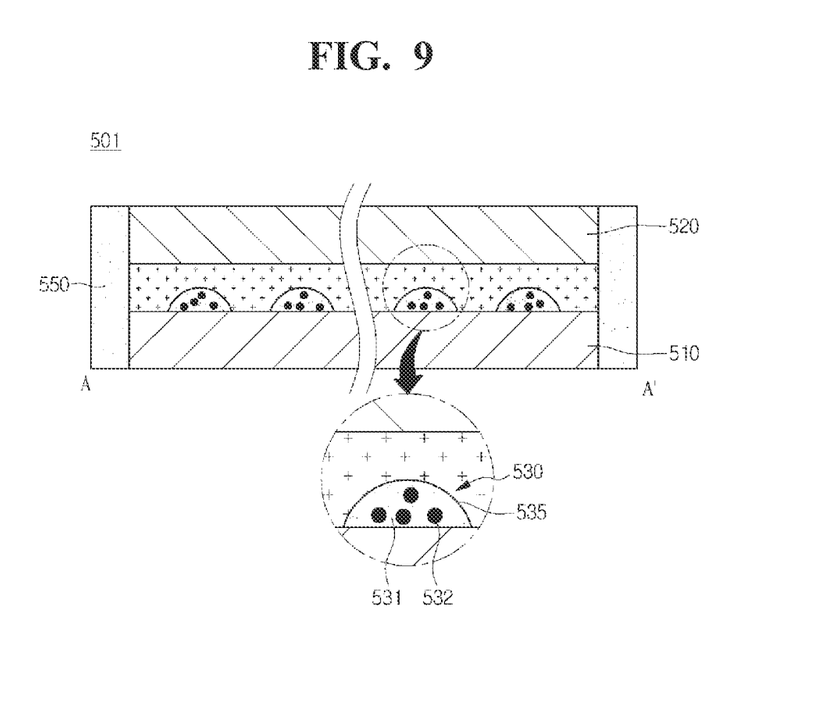
FIG. 9 is a plan view showing pixels and wavelength conversion parts.
Figure 10:
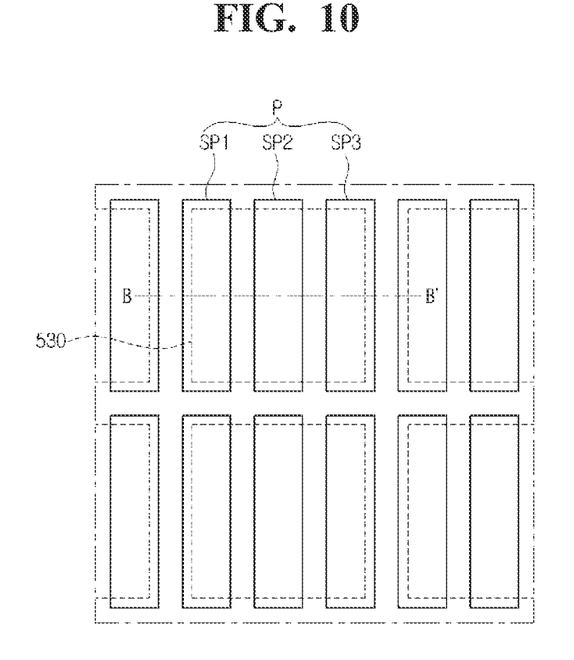
FIG. 10 is a sectional view showing a liquid crystal panel and a wavelength conversion member according to the embodiment.
Figure 11:
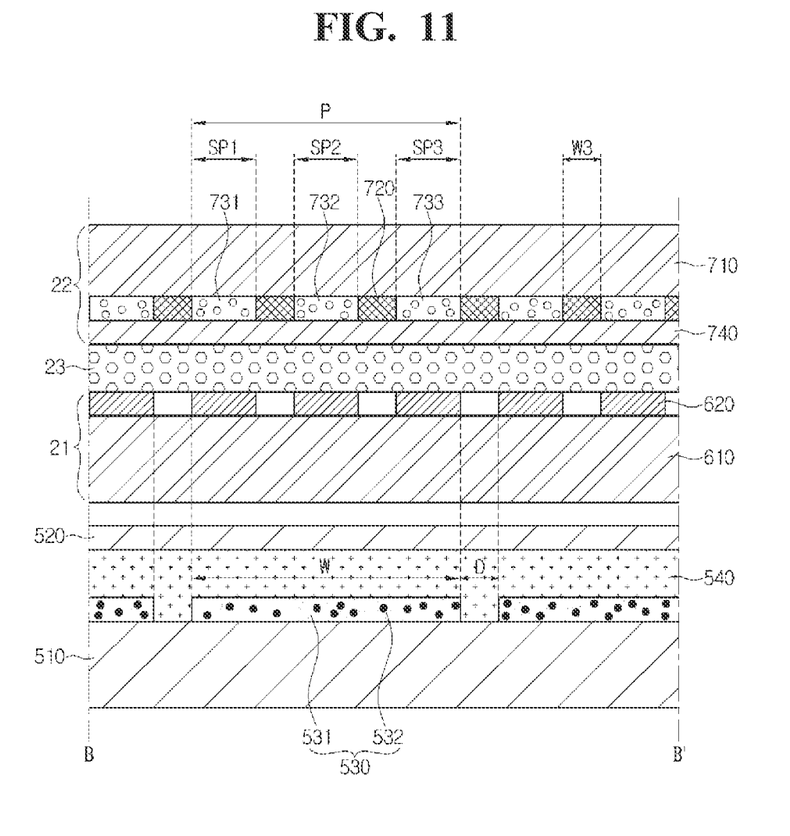
FIG. 11 is a sectional view showing a liquid crystal panel and a wavelength conversion member according to another embodiment.

FIG. 1 is an exploded perspective view showing a liquid crystal display according to the embodiment, FIG. 2 is a perspective view showing a wavelength conversion member according to the embodiment, and FIG. 3 is a sectional view taken along line A-A' of FIG. 2. FIGS. 4 to 6 are sectional views showing the manufacturing process of the wavelength conversion member according to the embodiment, FIG. 7 is a sectional view showing another example of the wavelength conversion member, and FIG. 8 is a sectional view showing still another example of the wavelength conversion member. FIG. 9 is a plan view showing pixels and wavelength conversion parts. FIG. 10 is a sectional view showing a liquid crystal panel and a wavelength conversion member according to the embodiment, and FIG. 11 is a sectional view showing a liquid crystal panel and a wavelength conversion member according to another embodiment.

Referring to FIGS. 1 to 3, the liquid crystal display according to the embodiment includes a backlight unit 10 and a liquid crystal panel 20.

The backlight unit 10 supplies light to the liquid crystal panel 20. The backlight unit 10 serves as a surface light source so that the light can be uniformly supplied to a bottom surface of the liquid crystal panel 20.

The backlight unit 10 is disposed below the liquid crystal panel 20. The backlight unit 10 includes a bottom cover 100, a light guide plate 200, a reflective sheet 300, a light source, for example, a plurality of light emitting diodes 400, a printed circuit board 401, and a plurality of optical sheets 500.

The upper portion of the bottom cover 100 is open. The bottom cover 100 receives the light guide plate 200, the light emitting diodes 400, the printed circuit board 401, the reflective sheet 300, and the optical sheets 500 therein.

The light guide plate 200 is disposed in the bottom cover 100 and arranged on the reflective sheet 300. The light guide plate 200 guides the light upward by totally-reflecting, refracting and scattering the light incident thereto from the light emitting diodes 400.

The reflective sheet 300 is disposed below the light guide plate 200. In more detail, the reflective sheet 300 is disposed between the light guide plate 200 and the bottom surface of the bottom cover 100. The reflective sheet 300 reflects the light upward as the light is output downward from the bottom surface of the light guide plate 200.

The light emitting diodes 400 serve as a light source for generating the light. The light emitting diodes 400 are disposed at one lateral side of the light guide plate 200. The light generated from the light emitting diodes 400 is incident into the light guide plate 200 through the lateral side of the light guide plate 200.

The light emitting diodes 400 may include a blue light emitting diode generating the blue light or a UV light emitting diode generating the UV light. In detail, the light emitting diodes 400 may emit the blue light having the wavelength band of about 430 nm to 470 nm or the UV light having the wavelength band of about 300 nm to 400 nm.

The light emitting diodes 400 are mounted on the printed circuit board 401. The light emitting diodes 400 may be disposed under the printed circuit board 401. The light emitting diodes 400 are driven by receiving a driving signal through the printed circuit board 401.

The printed circuit board 401 is electrically connected to the light emitting diodes 400. The printed circuit board 401 may mount the light emitting diodes 400 thereon. The printed circuit board 401 is disposed in the bottom cover 100.

The optical sheets 500 are disposed on the light guide plate 200. The optical sheets 500 supplies the light to the liquid crystal panel 20 by changing or enhancing the optical property of the light output from the top surface of the light guide plate 200.

The optical sheets 500 may include a diffusion sheet 501, a first prism sheet 502, a second prism sheet 503, and a wavelength conversion member 504.

The wavelength conversion member 504 may be disposed on the optical path between the light source 300 and the liquid crystal panel 20. For example, the wavelength conversion member 504 may be disposed on the light guide plate 200. In more detail, the wavelength conversion member 504 may be interposed between the second prism sheet 503 and the liquid crystal panel 20. In more detail, the wavelength conversion member 504 may be most adjacent to the liquid crystal panel 20. The wavelength conversion member 504 converts the wavelength of incident light so that the light is output upward. In more detail, the wavelength conversion member 504 converts the wavelength of the incident light so that the light can be directly output to the liquid crystal panel 20.

For instance, if the light emitting diodes 400 are blue light emitting diodes, the wavelength conversion member 504 converts the blue light output upward from the light guide plate 200 into the green light and the red light. In detail, the wavelength conversion member 504 converts a part of the blue light into the green light having the wavelength in the range of about 520 nm to about 560 nm, and a part of the blue light into the red light having the wavelength in the range of about 630 nm to about 660 nm.

Therefore, the white light may be generated by the light passing through the wavelength conversion member 504 without being converted and the lights converted by the wavelength conversion member 504. In detail, the white light may be incident into the liquid crystal panel 20 through the combination of the blue light, the green light and the red right.

In other words, the wavelength conversion member 504 is an optical member to change or improve the characteristic of the incident light. The wavelength conversion member 504 has the form of a sheet. In other words, the wavelength conversion member 504 may include an optical sheet.

The diffusion sheet 501 is provided above the light guide plate 200. The diffusion sheet 501 improves the uniformity of the passing light. The diffusion sheet 501 may include a plurality of beads.

The first prism sheet 502 is provided on the diffusion sheet 501. The second prism sheet 503 is provided on the first prism sheet 502. The first prism sheet 502 and the second prism sheet 503 increase the linearity of light passing through the first prism sheet 502 and the second prism sheet 503.

As shown in FIGS. 2 and 3, the wavelength conversion member 504 includes a lower substrate 510, an upper substrate 520, a plurality of wavelength conversion parts 530, a sealing layer 540, and a lateral side protective part 550.

The lower substrate 510 is disposed under the wavelength conversion parts 530. The lower substrate 510 is disposed under the liquid crystal panel 20. The lower substrate 510 may be transparent or flexible.

The lower substrate 510 may include a transparent polymer such as polyethyleneterephthalate (PET).

The upper substrate 520 is disposed on the sealing layer 540. The upper substrate 520 may be transparent and flexible. The upper substrate 520 may adhere to the top surface of the sealing layer 540.

The upper substrate 520 may include a transparent polymer such as PET.

The wavelength conversion parts 530 and the sealing layer 540 are sandwiched between the upper and lower substrates 520 and 510. The upper and lower substrates 520 and 510 support the wavelength conversion parts 530 and the sealing layer 540. The upper and lower substrates 520 and 510 protect the wavelength conversion parts 530 from external physical impact. The lower substrate 510 may directly make contact with the wavelength conversion parts 530 and the sealing layer 540. In addition, the upper substrate 520 may directly make contact with the sealing layer 540.

In addition, the upper and lower substrates 520 and 510 have low oxygen transmission rate and low moisture permeability. Thus, the upper and lower substrates 520 and 510 can protect the wavelength conversion parts 530 from external chemical penetration, such as oxygen and/or moisture.

The wavelength conversion parts 530 are interposed between the lower and upper substrates 510 and 520. The wavelength conversion parts 530 may adhere to the top surface of the lower substrate 510, and adhere to the bottom surface of the upper substrate 520. In other words, the wavelength conversion parts 530 may be directly arranged on the top surface of the lower substrate 510.

As shown in FIGS. 3 and 4, the wavelength conversion parts 530 may be spaced apart from each other. In other words, the wavelength conversion parts 530 may form a pattern on the lower substrate 510. In addition, the wavelength conversion parts 530 may have a rectangular parallelepiped shape In addition, as shown in FIG. 8, the wavelength conversion parts 530 may include an inclined surface 534. The inclined surface 534 is inclined with respect to the top surface of the lower substrate 510. The wavelength conversion parts 530 may have a triangular prism shape extending in one direction, a polygonal pyramid shape, a polygonal truncated pyramid shape, a conical shape, or a conical truncated shape.

As shown in FIG. 9, the wavelength conversion parts 530 may have a curved surface 535. For example, the wavelength conversion parts 530 may have a semi cylinder shape extending in one direction, or a semispherical shape.

In other words, the wavelength conversion member 504 may be divided into a region having the wavelength conversion parts 530 and a region having no the wavelength conversion parts 530. In other words, the top surface of the lower substrate 510 may be exposed between the wavelength conversion parts 530.

The wavelength conversion part includes a host 531 and a plurality of wavelength conversion particles 532.

The host 531 surrounds the wavelength conversion particles 532. In other words, the host 531 contains the wavelength conversion particles 532 uniformly distributed therein. The host 531 may include polymer such as silicon-based resin. The host 531 is transparent. In other words, the host 531 may include transparent polymer.

The host 531 is interposed between the upper and lower substrates 520 and 510. The host 531 may adhere to the top surface of the lower substrate 510 and may be spaced apart from the upper substrate 520.

The wavelength conversion particles 532 are interposed between the lower and upper substrates 510 and 520. In more detail, the wavelength conversion particles 532 are uniformly distributed into the host 531, and the host 531 may be interposed between the lower substrate 510 and the upper substrate 520.

The wavelength conversion particles 532 convert the wavelength of the light emitted from the light emitting diodes 400. In detail, the wavelength conversion particles 532 receive light emitted from the light emitting diodes 400 to convert the wavelength of the incident light. For instance, the wavelength conversion particles 532 may convert the blue light emitted from the light emitting diodes 400 into a red light. In other words, the wavelength conversion particles 532 may convert the blue light into the red light having the wavelength in the range of about 630 nm to about 660 nm.

If the light emitting diodes 400 are blue light emitting diodes that emit the blue light, the wavelength conversion particles 532 capable of converting the blue light into the red light may be employed.

The wavelength conversion particles 532 may include a plurality of quantum dots. The quantum dots may include core nano-crystals and shell nano-crystals surrounding the core nano-crystals. In addition, the quantum dots may include organic ligands bonded to the shell nano-crystals. In addition, the quantum dots may include an organic coating layer surrounding the shell nano-crystals.

The shell nano-crystals may be prepared as at least two layers. The shell nano-crystals are formed on the surface of the core nano-crystals. The quantum dots lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1nm to about 15 nm. In more detail, the quantum dot may have a diameter of about 8 nm to about 11 nm.

The wavelength of the light emitted from the quantum dots can be adjusted according to the size of the quantum dot. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle is reduced, so that the fluorescent light having the wavelength band of visible ray can be generated by adjusting the size of the particles. In addition, the quantum dot represents the extinction coefficient which is 100 to 1000 times higher than that of the general fluorescent pigment and has the superior quantum yield as compared with the general fluorescent pigment, so that strong fluorescent light can be generated.

The quantum dots can be synthesized through the chemical wet scheme. The chemical wet scheme is to grow the particles by immersing the precursor material in the organic solvent. According to the chemical wet scheme, the quantum dots can be synthesized.

The sealing layer 540 is provided on the lower substrate 510. In addition, the sealing layer 540 covers the wavelength conversion parts 530. The sealing layer 540 is provided on a lateral side and a top surface of the wavelength conversion parts 530. In more detail, the sealing layer 540 directly makes contact with the lateral side and the top surface of the wavelength conversion parts 530. In addition, the sealing layer 540 covers the lateral side and the top surface of the wavelength conversion parts 530. The sealing layer 540 adheres to the lateral side and the top surface of the wavelength conversion parts 530. In other words, the sealing layer 540 is coated on the top surface of the lower substrate 510, and the lateral side and the top surface of the wavelength conversion parts 530. The sealing layer 540 is provided in a space between the wavelength conversion parts 530.

The sealing layer 540 is interposed between the lower substrate 510 and the upper substrate 520. The sealing layer 540 may directly make contact with the lower and upper substrates 510 and 520. The sealing layer 540 may make contact with the whole bottom surface of the upper substrate 520.

The sealing layer 540 is transparent. The sealing layer 540 may include polymer. The sealing layer 540 may include silicon resin, perylene resin, or epoxy resin. The silicon resin may be formed by curing polysiloxan or siloxane oligomer. In addition, the epoxy resin may include hydrogenated epoxy resin, butadiene epoxy resin, or fluorine epoxy resin.

The wavelength conversion member 504 may be formed through the following process.

Referring to FIG. 5, a first resin composition including a plurality of wavelength conversion particles 532 is formed. The first resin composition may include silicon-based resin, epoxy-based resin, or acrylic-based rain. In addition, the first resin composition may contain a solvent such as toluene, hexan, or chloroform. The solvent may be contained at a ratio of about 10 wt % to about 30 wt % with respect to the resin composition.

In addition, the first resin composition may further include an adhesive agent or an adhesion agent serving as an organic binder. Therefore, the viscosity of the first resin composition may be in the range of about 450 cPs to about 30000 cPs. In addition, the wavelength conversion particles 532 may be uniformly distributed in the first resin composition through the mechanical scheme.

Thereafter, the first resin composition is coated on the lower substrate 510 through the screen coating process. In other words, the first resin composition is coated on the lower substrate 510 in the form of a pattern. Next, after removing a solvent from the first resin composition, the first resin composition is cured by light and/or heat, thereby forming the wavelength conversion parts 530.

Referring to FIG. 6, the second resin composition is coated on the wavelength conversion parts 530. The second resin composition may be uniformly coated on the top surface of the lower substrate 510 and the top surface and the bottom surface of the wavelength conversion parts 530. The second resin composition may be coated on the lower substrate 510 through a spray coating scheme or a spin coating scheme. The second resin composition may include perylene resin, polysiloxan, siloxane oligomer, or epoxy resin.

Thereafter, the sealing layer 540 may be formed by curing the coated second resin composition by light and/or heat.

Referring to FIG. 7, the upper substrate 520 is laminated on the sealing layer 540. Thereafter, a lateral side protective part 550 is formed on lateral sides of the sealing layer 540, the upper substrate 520, and the lower substrate 510. Therefore, the wavelength conversion member 504 may be formed.

The lateral side protective part is provided at a lateral side of the sealing layer 540. In more detail, the lateral side protective part 550 covers the lateral sides of the sealing layer 540, the upper substrate 520, and the lower substrate 510.

The lateral side protective part 550 and the upper substrate 520 may be omitted. In other words, the wavelength conversion member 504 can perform an intrinsic function thereof by employing only the lower substrate 510, the wavelength conversion members 530, and the sealing layer 540.

The wavelength conversion member 504 may further include first and second inorganic protective layers. The first inorganic protective layer is coated on the bottom surface of the lower substrate 510, and the second inorganic protective layer may be coated on the top surface of the upper substrate 520. The first and second inorganic protective layers may include silicon oxide.

The liquid crystal panel 20 is provided on the wavelength conversion member 504. In more detail, the liquid crystal panel 20 may directly make contact with the wavelength conversion member 504. In more detail, the wavelength conversion member 504 may adhere to the liquid crystal panel 20.

The liquid crystal panel 20 displays images by adjusting intensity of light passing through the liquid crystal panel 20. In detail, the liquid crystal panel 20 is a display panel for displaying the images by using the light emitted from the backlight unit 10. Referring to FIGS. 10 and 11, the liquid crystal panel 20 includes a TFT substrate 21, a color filter substrate 22 and a liquid crystal layer 23. In addition, the liquid crystal panel 20 includes polarizing filters provided on the bottom surface of the TFT substrate 21 and on the top surface of the color filter substrate 22.

The TFT substrate 21 is provided in opposition to the color filter substrate 22. The TFT substrate 21 may apply an electric field to the liquid crystal layer 23 in the unit of a pixel together with the color filter substrate 22. The TFT substrate 21 includes a first transparent substrate 610 and a plurality of pixel electrodes 620.

The first transparent substrate 610 is transparent and has a plate shape. The first transparent substrate 610 may include a glass substrate. In addition, the first transparent substrate 610 includes an insulator.

The pixel electrodes 620 are provided on the first transparent substrate 610. The pixel electrodes 620 apply an electric field to the liquid crystal layer 23. The pixel electrodes 620 may be provided corresponding to pixels of the liquid crystal panel 20, respectively. Therefore, the pixel electrodes 620 can apply the electric field to the pixels P of the liquid crystal panels 20, respectively.

The pixel electrodes 620 are transparent, and include a conductor. The pixel electrodes 620 may include indium tin oxide or indium zinc oxide.

Although not shown in accompanying drawings, the TFT substrate 21 may further include a plurality of gate lines, a plurality of data lines crossing the gate lines, and a plurality of thin film transistors (TFTs).

The gate lines are provided in parallel to each other to apply gate signals to the TFTs. In other words, the gate lines are used to apply gate signals to drive the TFTs.

The data lines apply data signals to the pixel electrodes 620 through the operations of the TFTs. The pixel electrodes 620 apply an electric field to the liquid crystal layer 23 by the data signals. In other words, the data signals represent predetermined voltage used to apply an electric field to the liquid crystal layer 23 by the pixel electrodes 620.

The TFTs may be provided at cross regions of the gate lines and the data lines. The TFTs may perform a switch function between the data lines and the pixel electrodes 620. In other words, the TFTs selectively connect the pixel electrodes 620 to the data lines according to the gate signals.

In addition, the TFT substrate 21 may further include insulating layers (not shown) to insulate the gate lines, the data lines, and the pixel electrodes 620 from each other.

The color filter substrate 22 is provided over the TFT substrate 21. The color filter substrate 22 is provided in opposition to the TFT substrate 21. The color filter substrate 22 is spaced apart from each other the TFT substrate 21 by a predetermined distance. The color filter substrate 22 includes a second transparent substrate 710, a black matrix 720, first color filters 731, second color filters 732, third color filters 733, and a common electrode 740.

The second transparent substrate 710 is provided in opposition to the first transparent substrate 610. The second transparent substrate 710 is provided over the first transparent substrate 610. The second transparent substrate 710 is transparent, and has a plate shape. The second transparent substrate 710 may include a glass substrate. In addition, the second transparent substrate 710 may include an insulator.

The black matrix 720 is provided under the second transparent substrate 710. The black matrix 720 shields the light. In other words, the black matrix 720 is a light shielding part to shield incident light. The black matrix 720 may include an opening part corresponding to the pixels P. The black matrix 720 may include black resin or a chrome oxide layer.

In addition, the black matrix 720 may serve as a partition to divide the first color filters 731, the second color filters 732, and the third color filters 733 from each other. The black matrix 720 may have a width W3 in the range of about 15 μm to about 35 μm.

The first color filters 731 are provided under the second transparent substrate 710. The first color filters 731 are provided in the opening part of the black matrix 720. The first color filters 731 may be surrounded by the black matrix 720.

The first color filter 240 may receive white light to output red light. In other words, the first color filter 240 may output light having a predetermined wavelength band. For example, the first color filter 240 may output light having a wavelength band of about 600 nm to about 700 nm through light filtering.

The first color filters 731 filter incident light. In more detail, the first color filters 731 absorb light having a predetermined wavelength band, and reflect or transmit light having a predetermined wavelength band. For example, the first color filters 731 absorb blue light and green light of incident white light and transmit red light.

The first color filters 731 may include red dyes and/or red pigments. For example, the first color filters 731 may include perylene-based compound or diketo pyrrolopyrrole-based compound.

The second color filters 732 are provided under the second transparent substrate 710. In addition, the second color filters 732 may be provided beside the first color filters 731. The second color filters 731 are provided in the opening parts of the black matrix 720. The second color filters 732 may be surrounded by the black matrix 720.

The second color filters 732 receive white light and output red light. In other words, the second color filters 732 may output light having a predetermined wavelength band. For example, the second color filters 732 may output light having a wavelength band in the range of about 500 nm to about 600 nm through light filtering.

The second color filters 732 filter incident light. In more detail, the second color filters 732 absorb light having a predetermined wavelength band and transmit light having a predetermined wavelength band. For example, the second color filters 732 may absorb blue light and red light of the incident white light and transmit green light.

The second color filters 732 may include green dyes and/or green pigments. For example, the second color filters 732 may include phthalocyanine-based compound.

The third color filters 733 are provided under the second transparent substrate 710. In addition, the third color filters 733 may be provided beside the second color filters 732. The third color filters 733 are provided in the opening part of the black matrix 720. The third color filters 733 may be surrounded by the black matrix 720.

The third color filters 733 may receive white light and output blue light. In other words, the third color filters 733 may output light having a predetermined wavelength band. For example, the third color filters 733 may output light having a predetermined wavelength band of about 400 nm to about 500 nm through light filtering.

The third color filters 733 filters light incident. In more detail, the third color filters absorb light having a predetermined wavelength band and transmit light having a predetermined wavelength band. For example, the third color filters 733 absorb red light and green light of the incident white light and transmit blue light.

The third color filters 733 may include blue dies and/or glue pigments. For example, the third color filters 733 may include copper phthalocyanine-based compound or anthraquinone-based compound.

The common electrode 740 is provided under the second transparent substrate 710. In more detail, the common electrode 740 is provided under the first, second, third color filters 731, 732, and 733.

In addition, an over coating layer may be interposed between the color filters 731, 732, and 733 and the common electrode 740.

The common electrode 740 is a transparent conductor. The common electrode 740 may include indium tin oxide or indium zinc oxide.

The liquid crystal layer 23 is interposed between the TFT substrate 21 and the color filter substrate 22. In more detail, the liquid crystal layer 23 is interposed between the pixel electrode 620 and the common electrode 740. In addition, an alignment layer may be interposed between the TFT substrate 21 and the liquid crystal layer 23, or may be interposed between the color filter substrate 22 and the liquid crystal layer 23.

The liquid crystal layer 23 is aligned by the electric field between the common electrode 740 and the pixel electrodes 620. Accordingly, the liquid crystal layer 23 can adjust the characteristic of light passing through the liquid crystal layer 23 in the unit of a pixel. In other words, the liquid crystal layer 23 displays an image by the applied electric field together with the polarizing filters provided under the first transparent substrate 610 and provided on the second transparent substrate 710.

The liquid crystal layer 23 may include smetic liquid crystal, nematic liquid crystal, or cholesteric liquid crystal.

Referring to FIGS. 10 and 11, the liquid crystal panel 20 and the wavelength conversion member 504 may be aligned with each other.

The liquid crystal panel 20 includes a plurality of pixels P. Each pixel may be a unit to display an image. In addition, each pixel P may include three sub-pixels SP1, SP2, and SP3. In more detail, each pixel P may include the first sub-pixel SP1 to display a red image, a second sub-pixel SP2 to display a green image, and a third sub-pixel SP3 to display a blue image.

Therefore, each sub-pixel P includes one color filter. In more detail, the first sub-pixel SP1 includes one first color filter 731. In addition, the second sub-pixel SP2 includes one second color filter 732. In addition, the third sub-pixel SP3 includes one third color filter 733.

In addition, the black matrix 720 corresponds to the boundary of the sub-pixels SP1, SP2, and SP3. In other words, the black matrix 720 is provided along the outer portion of the sub-pixels SP1, SP2, and SP3. In addition, a portion of the black matrix 720 corresponds to the boundary of the pixels P. In other words, a portion of the black matrix 720 is provided along the outer portion of the pixels P.

In addition, the wavelength conversion member 504 is aligned with the liquid crystal panel 20. In more detail, the wavelength conversion parts 530 may be aligned with the pixels P. In more detail, the wavelength conversion parts 530 may correspond to the pixels P, respectively. In other words, the wavelength conversion parts 530 may be provided at regions corresponding to the pixels P. In other words, each wavelength conversion part 530 may face each pixel P.

In other words, each wavelength conversion part 530 may cover one first sub-pixel SP1, one second sub-pixel SP2, and one third sub-pixel SP3. In other words, each wavelength conversion part 530 may overlap with one first sub-pixel SP1, one second sub-pixel SP2, and one third sub-pixel SP3.

Therefore, the black matrix 720 may be provided between the wavelength conversion parts 530. In other words, a portion of the black matrix 720 may be interposed between the wavelength conversion parts 530, and another portion of the black matrix 720 may overlap with the wavelength conversion parts 530.

Therefore, the wavelength conversion parts 530 may have a width W in the range of about 200 μm to about 350 μm. In more detail, the wavelength conversion parts 530 may have the width W in the range of about 250 μm to about 300 μm. In this case, an interval D between the wavelength conversion parts 530 may be in the range of about 15 μm to about 35 μm.

Figure 12:
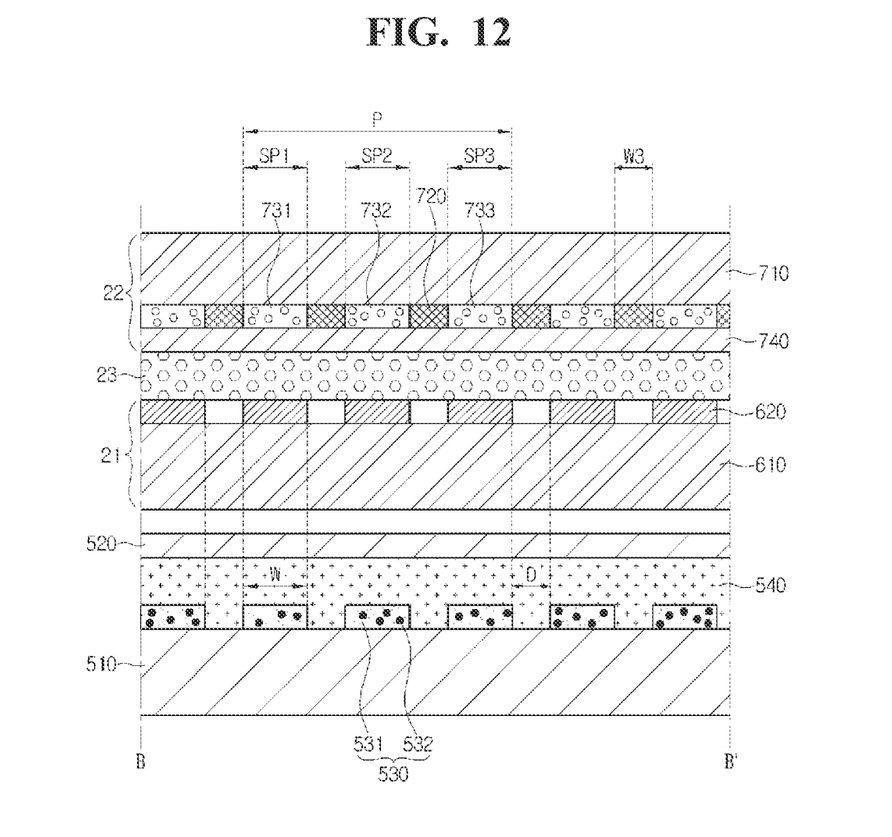
FIG. 12 is a sectional view showing a liquid crystal panel and a wavelength conversion member according to still another embodiment.

Referring to FIG. 12, the wavelength conversion parts 530 may correspond to the sub-pixels SP1, SP2, and SP3, respectively. In other words, each wavelength conversion part 530 corresponds to each of the sub-pixels SP1, SP2, and SP3. In more detail, each wavelength conversion part 530 may overlap with an entire portion of each of the sub-pixels SP1, SP2, and SP3.

Therefore, the entire portion of the black matrix 720 is provided between the wavelength conversion parts 530. In other words, the black matrix 720 may correspond to the outer portions of the wavelength conversion parts 530.

Therefore, the width W of each of the wavelength conversion parts 530 may be in the range of about 65 μm to about 120 μm. In more detail, the width W of the wavelength conversion parts 530 may be in the range of about 80 μm to about 100 μm. In addition, the interval D between the wavelength conversion parts 530 may be in the range of about 15 μm to about 35 μm.

As described above, according to the liquid crystal display of the embodiment, each wavelength conversion part 530 is matched with each pixel P, or each sub-pixel SP1, SP2, or SP3. In this case, more many wavelength conversion particles 532 may be provided in the region corresponding to the pixel P or the sub-pixel SP1, SP2, or SP3. Therefore, actually, light with improved color reproduction can be incident into the pixels P or the sub-pixels SP1, SP2, and SP3, which require light.

Therefore, the liquid crystal display according to the embodiment can represent improved color reproduction.

In addition, the liquid crystal panel 20 is provided at the edge thereof with a driving PCB 25 to supply driving signals to the gate lines and the data lines.

The driving PCB 25 is electrically connected to the liquid crystal panel 20 through a COF (Chip on Film) 24. In this case, the COF 24 may be replaced with a TCP (Tape Carrier Packaged).

In addition, the sealing layer 540 covers the lateral side of the wavelength conversion parts 530 and the top surface of the wavelength conversion parts 530 to protect the wavelength conversion parts 530, that is, the wavelength conversion particles 532 from being external oxygen and/or moisture. In other words, since the sealing layer 540 seals the lateral side of each wavelength conversion part 530, the sealing layer 540 can represent improved sealing power.

Therefore, the liquid crystal display according to the embodiment can represent improved reliability and improved durability.

In addition, the wavelength conversion parts 530 are spaced apart from each other. Therefore, the wavelength conversion particles 532 are not provided in the space between the wavelength conversion parts 530. Therefore, the optical member and the display device according to the embodiment can reduce the number of wavelength conversion particles 532 to be used.

Therefore, the liquid crystal display according to the embodiment can be easily fabricated at a low cost.

In particular, the wavelength conversion particles 532 may include quantum dots including cadmium (Cd). In this case, the cadmium (Cd) is metal noxious to a human body. In this case, since the liquid crystal display according to the present embodiment can reduce the number of the wavelength conversion particles 532 to be used, the liquid crystal display according to the present embodiment is eco-friendly. In particular, when comparing with a case in which the wavelength conversion parts 530 are formed under the entire portion of the liquid crystal panel 20, the liquid crystal display according to the present embodiment can reduce the use of the wavelength conversion particles 532 by about 25%.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a light source including a blue light emitting diode generating light;
   a PCB (printed circuit board) having the light source mounted thereon;
   a light guide plate into which light from the light source is incident;
   a reflective sheet under the light guide plate;
   an optical member on the light guide plate; and
   a display panel on the optical member,
   wherein the optical member is provided under the display panel,
   wherein the optical member converts the wavelength of incident tight from the light source and outputs light with the converted wavelength to the display panel,
   wherein the optical member comprises:
      a lower substrate;
      an upper substrate on the lower substrate;
      a host between the lower substrate and the upper substrate;
      a plurality of wavelength conversion particles in the host; and
      a sealing layer between the lower substrate and the upper substrate,
      wherein the sealing layer of the optical member is in direct physical contact with the host;
   wherein a surface of the host that is in direct physical contact with the sealing layer comprises an inclined surface, which is inclined with respect to a top surface of the lower substrate,
   wherein the lower substrate and the upper substrate include a same material,
   wherein the lower substrate and the upper substrate include polyethylene terephthalate (PET),
   wherein the wavelength conversion particles comprise quantum dots,
   wherein the light source is disposed on a lateral side of the light guide plate,
   wherein the wavelength conversion particles comprise quantum dots,
   wherein the light source is disposed on a lateral side of the light guide plate,
   wherein the display panel includes a plurality of color filters,
   wherein the host includes a concavo-convex pattern and the inclined surface is a portion of the concavo-convex pattern,
   wherein the concavo-convex pattern of the host includes convex parts and a concave part between the convex parts, and
   wherein a width of each convex part of the concavo-convex pattern is in a range of from 65 μm to 120 μm.

2. The display device of claim 1, wherein the inclined surface further comprises a curved surface.

3. The display device of claim 1, wherein the wavelength conversion particles comprise core nano-crystals and shell nano-crystals surrounding the core nano-crystals.

4. The display device of claim 3, wherein the core nano-crystals comprise Cdse, InGaP, CdTe, CdS, ZnSe, ZnTe, ZnS, HgTe, or HgS.

5. The display device of claim 3, wherein the shell nano-crystals comprise CuZnS, CdSe, CdTe, CdS, ZnSe, ZnTe, ZnS, HgTe, or HgS.

6. The display device of claim 1, wherein the host comprises silicon-based resin.

7. The display device of claim 1, wherein the host comprises a plurality of surfaces in direct physical contact with the sealing member, wherein each of the surfaces of the host that are in direct physical contact with the sealing member comprises a surface that is inclined with respect to the top surface of the lower substrate.

8. The display device of claim 1, wherein the PCB is disposed under the light source and extends along the lateral side of the light guide plate.

9. The display device of claim 1, further comprising: a first inorganic protective layer on a bottom surface of the lower substrate of the optical member; and a second inorganic protective layer on a top surface of the upper substrate of the optical member.

10. The display device of claim 1, wherein the sealing layer includes a concavo-convex surface corresponding to the concavo-convex pattern of the host.

11. The display device of claim 10, wherein the inclined surface further comprises a curved surface.

12. The display device of claim 1, wherein each convex part of the concavo-convex pattern is disposed below a color filter of the plurality of color filters, and
    wherein the width of each convex part of the concavo-convex pattern corresponds to that of the color filter below which it is disposed.

* * * * *